March 15, 1960 E. QUARMBY ET AL 2,928,984

ELECTRONIC CIRCUIT ARRANGEMENTS

Filed Feb. 27, 1958

INVENTORS
ERIC QUARMBY
HENRY ARNOLD RICHARDSON

ATTORNEY

United States Patent Office 2,928,984
Patented Mar. 15, 1960

2,928,984

ELECTRONIC CIRCUIT ARRANGEMENTS

Eric Quarmby and Henry Arnold Richardson, Sale, England, assignors to Metropolitan-Vickers Electrical Company Limited, London, England, a British company Application February 27, 1958, Serial No. 718,051

Claims priority, application Great Britain March 6, 1957

4 Claims. (Cl. 315—22)

This invention relates to electronic circuit arrangements and has particular application in cathode ray tube auxiliary circuits i.e. circuits for providing the appropriate working potentials and operating pulses to the electrodes of cathode ray tubes.

In cathode ray tube auxiliary circuits it is customary to provide brilliance control for the tube by employing a potentiometer chain from which is derived a variable voltage which is used to set the mean grid voltage. Any required pulses, such as brightening pulses, are coupled by means of a high voltage capacitor.

Where very low sweep rates, or "single shot" operation of the cathode ray tube is required difficulties are experienced with conventional circuitry in controlling tube brightness. With low sweep rates the coupling capacitor loses charge and thus fails to perform in the manner required, while in "since shot" operation the brilliance setting has to be high in order that an adequate picture can be observed in the brief time the beam is moving. Furthermero,e or switching a cathode ray tube circuit on, special care has to be taken that high voltages are not caused in the cathode ray tube grid circuit due to the charging current of the coupling capacitor. Additionally, due to the decoupling effect of a large grid capacitor the extra high tension supply must have a hum and random fluctuation level substantially less than the bias voltage on the cathode ray tube. At low frequencies this usually means that a stabilised extra high tension supply must be employed.

According to the present invention a cathode ray tube supply circuit comprises two resistance chains each connected across the extra high tension supply to the tube, a thermionic amplifier valve having a cathode resistor, which valve and resistor is included in one of said chains and the control grid of which valve is connected to a point on said other resistance chain (or a resistance chain in parallel therewith), together with respective connection points in each of said two chains for connection to the control grid and cathode of a cathode ray tube, one of said connection points being in the anode circuit of the valve.

Preferably, the relative values of the resistors comprising the chains are so chosen that any voltage variations in the extra high tension supply do not appear between the connection points to the cathode and control grid of the tube.

In one embodiment of the invention the point to which the control grid of the valve is connected is an appropriate point on the other of the two resistance chains. Alternatively, a third resistance chain may be provided which is also connected across the extra high tension supply and to which the control grid of the valve is connected.

It is envisaged that one of the resistance chains will be connected through a potentiometer to provide a brilliance control for the cathode ray tube while the same, or the other, resistance chain will be directly coupled to the time-base circuit of the tube to provide brightening pulses.

In order that the invention may be more fully understood reference will now be made to the drawing accompanying this specification, in which.

Figure 1:
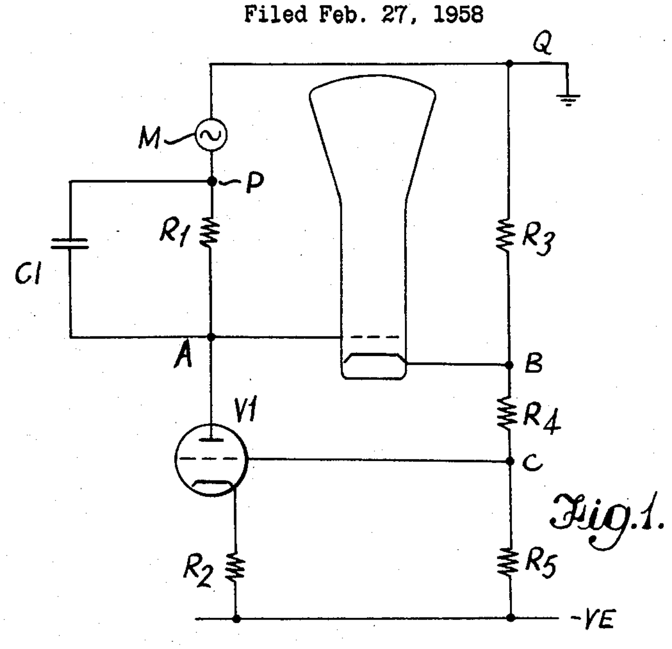
Fig. 1 shows one embodiment of the invention applied to a cathode ray tube circuit.

Referring to Fig. 1, two resistance chains are provided in the auxiliary circuit of cathode ray tube 1, one of these chains is connected between a point P and the extra high tension negative supply terminal, while the other resistance chain is connected between point Q and the same supply terminal. The first resistance chain comprises a triode valve V1 having an anode resistor R1 and a cathode resistor R2. A connection is provided from point A at the anode of valve V1 to the control grid of cathode ray tube 1. The second resistance chain comprises three resistors R3, R4 and R5 connected in series with a connection from point B at the junction of R3 and R4 to the cathode of tube 1 and a connection from point C at the junction of R4 and R5 to the control grid of valve V1. Point Q is normally connected to the positive terminal of the extra high tension supply which is normally earth potential while point P is directly connected to the time base circuit M of the cathode ray tube and/or to a brilliance control potentiometer.

Consider the effect of a variation in the voltage of M and hence of point P. To those skilled in the art it will be seen that cathode resistor R2 of valve V1 provides a measure of negative current feedback to V1 and thus at point A valve V1 appears as a high impedance. If this impedance be sufficiently high relative to R1 a large proportion of the voltage change at point P will appear at point A and will be in turn fed to the control grid of tube 1. Thus brilliance control can be effected by variations of the potential of point P.

The effect of variations in the extra high tension supply voltage, i.e. variations to the potentials of point P and point Q together can best be considered by a simple mathematical analysis. Let a voltage change of ΔV be applied at points P and Q, then $$\Delta V_B = \Delta V \frac{R4+R5}{R3+R4+R5} \quad (1)$$

and $$\Delta V_C = \Delta V \frac{R5}{R3+R4+R5} \quad (2)$$

while $$\Delta V_A = \Delta V \left[ \frac{(u+1)R2+Ra}{R1+(u+1)R2+Ra} - \frac{R5}{R3+R4+R5} \cdot \frac{uR1}{Ra+R1+(1+u)R2} \right] \quad (3)$$

where $\Delta V_A$, $\Delta V_B$, $\Delta V_C$ are the voltage changes produced at points A, B, C by voltage change ΔV and R$a$ and $u$ are the A.C. resistance and amplification factor of V1. Clearly, for the condition that no change in voltage difference is to exist between the grid and cathode of the tube, $V_A$ must equal $\Delta V_B$.

Thus equating 1 and 3 it can be shown that $$\frac{R3}{R1} = \frac{R4+(1+u)R5}{Ra+(1+u)R2} \quad (4)$$

In a practical arrangement R4, R5, R$a$ and R2 are of similar value and thus $$(1+u)R5 >> R4 \text{ and } (1+u)R2 > Ra$$

This enables Equation 4 to be simplified to $$\frac{R3}{R1} \simeq \frac{R5}{R2} \quad (5)$$

Thus provided Equation 5 is satisfied the voltage fluctuation between the grid and cathode of the cathode ray tube will be eliminated. The type of triode used is not critical but it is desirable that it should have a high amplification factor since this couples the greatest fraction of the pulse voltage to the grid of the cathode ray tube.

Thus it can be seen that if a modulating voltage is applied to point P which is superimposed on the extra high tension supply voltage, modulation of the voltage between grid and cathode of the cathode ray tube is possible. In most standard time-base circuits it is possible to obtain a waveform which will enable the trace to be "blacked out" during the flyback and/or quiescent state, i.e. during the wait period on single shot operation. Furthermore voltage fluctuations in the extra high tension supply do not appear in the grid cathode circuit of the cathode ray tube and it is thus possible to simplify the smoothing of the extra high tension supply from its power pack.

To enable fast edges in the grid modulating waveform to reach the grid of the cathode ray tube it may be desirable to provide a small capacitor C1 to by-pass resistance R1. This may be made up of a number of low voltage units shunting the resistors which R1 usually comprises.

In considering the action of the circuit of Fig. 1, it will be realised that the current from the cathode ray tube cathode is degenerative for two reasons, firstly due to the series cathode resistance formed by R4 and R5 and secondly the voltage caused by the cathode current across R5 is amplified and inverted and applied to the control grid of the cathode ray tube. The result of this is that a considerably larger voltage is required at the positive end of R1 to drive the control grid of the cathode ray tube satisfactorily.

Figure 2:
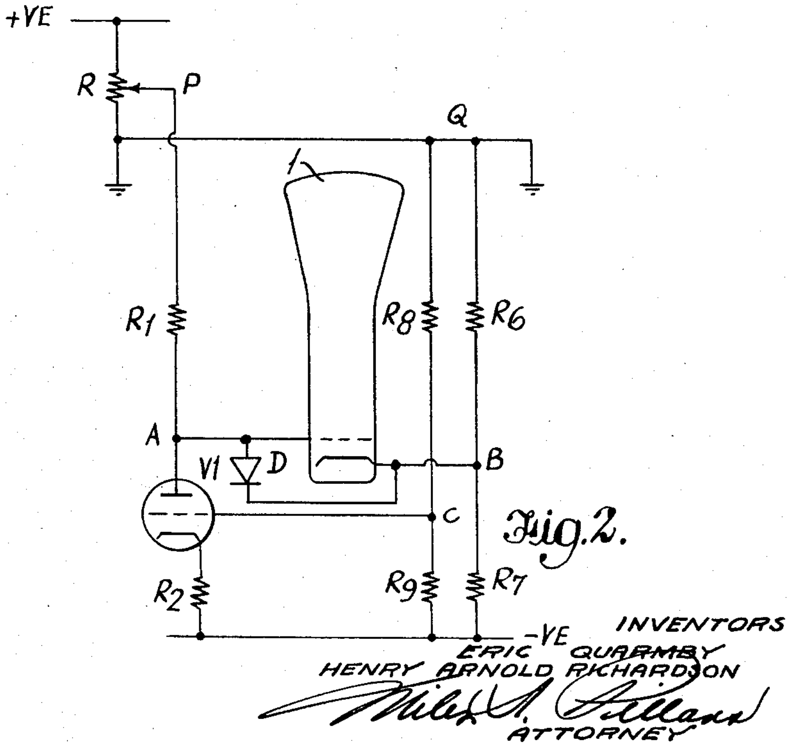
Fig. 2 shows a modification of the embodiment of Fig. 1.

In order to overcome this difficulty the circuit of Fig. 1 may be modified as shown in Fig. 2. This modification is particularly useful for cathode ray tubes which pass a large cathode current. In the modification shown in Fig. 2 in which like parts are given like reference numerals the resistance chain formed by R3, R4 and R5 is replaced by two separate resistance chains each connected across the extra high tension supply. One resistance chain is formed by resistors R6 and R7 and the cathode is connected to point B at the junction of these two resistors. The other resistance chain is formed by resistors R8 and R9 and the control grid of valve V1 is taken to point C at the junction of these two latter resistors. The condition for eliminating voltage fluctuations between the cathode and control grid of the cathode ray tube is similar in this modification as in the previous arrangement.

Analysis of Fig. 2 yields $$\frac{R6}{R1}=\frac{R7+\frac{u}{K}R9}{(1+u)R2+Ra} \quad (6)$$

where $K=(R8+R9)/(R6+R7)$ i.e. is the ratio of the currents in the two chains.

Thus, since R$a$, R2, R9 and R7 are usually in a practical circuit of approximately equal magnitude and K is near to unity Equation 6 may be reduced to $$\frac{R6}{R1}=\frac{R9/K}{R2} \quad (7)$$

A silicon diode D, Fig. 2, or similar rectifying device is desirable to prevent the control grid of the cathode ray tube going positive with respect to its cathode in any circumstance.

In Fig. 2 there is also shown a potentiometer R connected between earth and a point of positive potential. Point P is connected to the tapping point of potentiometer R and variations in the position of this tapping point will produce corresponding voltage differences between the cathode and control grid of the cathode ray tube and thus control its brilliance. Of course, point P in Fig. 1 can be connected to a similar potentiometer.

Circuit M may comprise any standard time base circuit directly connected to point P to provide brightening pulses and for instance a "Miller" circuit or a "boot strap" circuit may be used.

What we claim is:

1. A cathode ray tube supply circuit comprising an extra high tension supply for a cathode ray tube, a first resistance chain connected across said extra high tension supply, a thermionic amplifier valve having a cathode and anode serially connected in said resistance chain so that a part of said chain provides resistance in the cathode circuit of said valve, a second resistance chain connected across said extra high tension supply, a connection point in said second resistance chain, a connection between the control grid of said valve and said connection point, a terminal point for connection to the control grid of a cathode ray tube, a terminal point for connection to the cathode of said cathode ray tube, said two terminal points and said valve grid connection point being respectively connected to such positions on said two resistance chains that any variations in the extra high tension supply do not appear between said terminal points.

2. A cathode ray tube supply circuit comprising an extra high tension supply for a cathode ray tube, a resistance chain connected across said extra high tension supply, potential varying means in series with said resistance chain, a thermionic amplifier valve having a cathode and an anode serially connected in said resistance chain so that a part of said chain provides resistance in the cathode circuit of said valve, the control grid of said valve being connected to a potential dividing circuit across said extra high tension supply, a terminal point for connection to the control grid of a cathode ray tube, a terminal point for connection to the cathode of said cathode ray tube, said two terminal points being respectively connected to said resistance chain and to a potential dividing circuit across said extra high tension supply, such that any voltage variations of said potential varying means appear between the control grid and cathode of said cathode ray tube but any variations in said extra high tension supply do not so appear.

3. A cathode ray tube supply circuit comprising an extra high tension supply for a cathode ray tube, a resistance chain connected across said extra high tension supply, a brilliance control potentiometer in series with said resistance chain, a thermionic amplifier valve having a cathode and an anode serially connected in said resistance chain so that a part of said chain provides resistance in the cathode circuit of said valve, the control grid of said valve being connected to a potential dividing circuit across said extra high tension supply, a terminal point for connection to the control grid of a cathode ray tube, a terminal point for connection to the cathode of said cathode ray tube, said two terminal points being respectively connected to said resistance chain and to potential dividing circuit across said extra high tension supply, such that any voltage variations of said brilliance control potentiometer appear between the control grid and cathode of said cathode ray tube but any variations in said extra high tension supply do not so appear.

4. A cathode ray tube supply circuit comprising an extra high tension supply for a cathode ray tube, a resistance chain connected across said extra high tension supply, a brightening pulse circuit in series with said resistance chain, a thermionic amplifier valve having a cathode and an anode serially connected in said resistance chain so that a part of said chain provides resistance in the cathode circuit of said valve, the control grid of said valve being connected to a potential dividing circuit across said extra high tension supply, a terminal point for connection to the control grid of a cathode ray tube, a terminal point for connection to the cathode of said cathode ray tube, said two terminal points being respectively connected to said resistance chain and to a potential dividing circuit across said extra high tension supply, such that any voltage variations of said brightening pulse circuit appear between the control grid and cathode of said cathode ray tube but any variations in said extra high tension supply do not so appear.

References Cited in the file of this patent

UNITED STATES PATENTS

| | | |
|---|---|---|
| 2,004,790 | Hehlgans | June 11, 1935 |
| 2,470,048 | Norton | May 10, 1949 |
| 2,537,807 | Anderson | Jan. 9, 1951 |
| 2,825,758 | Revercomb | Mar. 4, 1958 |
| 2,879,471 | Erath | Mar. 24, 1959 |
| 2,879,472 | Worden | Mar. 24, 1959 |

FOREIGN PATENTS

| | | |
|---|---|---|
| 152,106 | Australia | June 30, 1953 |